DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 20, 1970

870 O.G. 727

T870,016

SYNERGISTIC INSECTICIDAL COMPOSITIONS CONTAINING CYCLOPROPANECARBOXYLATES AND ω-ALKYNYL (LOWER ALKYL) PHOSPHINATES

Ronald Eugene Montgomery, 46 S. Vernon St., Middleport, N.Y. 14105, and Harry Hobart Incho, 137 Ensign Ave., Medina, N.Y. 14103

Filed Apr. 3, 1969, Ser. No. 813,290

Int. Cl. A01n *9/08, 9/36*

U.S. Cl. 424—219

No Drawing. 12 Pages Specification

Synergistic insecticidal combinations of esters of cyclopropanecarboxylic acid, e.g. allethrin, pyrethrins, (5-benzyl-3-furyl)methyl 2,2,3,3 - tetramethylcyclopropanecarboxylate, (5-benzyl-3-furyl)methyl chrysanthemumate, and (1-cyclohexene-1,2-dicarboximido)methyl chrysanthemumate, with ω-alkynyl (lower alkyl) (aryl)phosphinates, are described. The preparation and physical properties of representative phosphinates are exemplified, and the insecticidal properties of synergistic combinations of said phosphinates with representative cyclopropanecarboxylates are reported.